United States Patent
Hine

[19]

[11] Patent Number: 6,044,961
[45] Date of Patent: Apr. 4, 2000

[54] APPARATUS FOR DISPLAYING ADVERTISING INFORMATION ON CONVEYOR PANELS

[76] Inventor: Laurence J. Hine, 5892-188th Street, Surrey, British Columbia, Canada, V3S 7M1

[21] Appl. No.: 09/060,108

[22] Filed: Apr. 15, 1998

[51] Int. Cl.[7] ............................................. B65G 43/00
[52] U.S. Cl. ........................... 198/502.1; 40/472; 40/526
[58] Field of Search ........................... 198/502.1; 40/472, 40/524, 526

[56] References Cited

U.S. PATENT DOCUMENTS

| | | |
|---|---|---|
| 3,395,472 | 8/1968 | Look . |
| 3,410,390 | 11/1968 | Petersen . |
| 3,849,918 | 11/1974 | Mazzocco, Sr. . |
| 3,881,592 | 5/1975 | Stimpson . |
| 4,979,591 | 12/1990 | Habegger et al. . |
| 5,165,526 | 11/1992 | Conklin, Jr. . |
| 5,244,080 | 9/1993 | Bierbaum . |
| 5,280,831 | 1/1994 | Conklin, Jr. . |
| 5,311,980 | 5/1994 | Munkner et al. . |
| 5,358,094 | 10/1994 | Molinaro et al. . |
| 5,427,227 | 6/1995 | Crandall et al. . |
| 5,596,828 | 1/1997 | Smallwood . |

*Primary Examiner*—Joseph E. Valenza
*Attorney, Agent, or Firm*—Hall, Priddy & Myers

[57] ABSTRACT

A conveyor panel for a conveyor which has a series of such panels which move in a closed path having linear sections and curved sections. The conveyor panel consists of a belt plate, a transparent plate, and a graphic display panel. The belt plate is affixable to the conveyor and has a display region consisting of a recess bounded by two thickened regions along opposite sides of the belt plate and having slots extending from the recess into the two thickened regions. The transparent plate has protruding edges which slide into the slots when the transparent plate is inserted into the recess and securely hold the transparent plate to the belt plate. The graphic display panel is positioned adjacent an underside of the transparent plate within said recess.

14 Claims, 7 Drawing Sheets

APPARATUS FOR DISPLAYING ADVERTISING INFORMATION ON CONVEYOR PANELS

FIELD

The present invention relates to an apparatus for displaying advertisements on conveyor panels permitting ease in affixation and removal of the advertisements.

BACKGROUND OF THE INVENTION

In airports, or other locations employing publicly accessible conveyors, advertisements are sometimes conspicuously displayed on the conveyor panels. Typically, the advertisements are affixed to the conveyor panel either by means of an adhesive or using screws to pass through an overlying transparent sheet. The presence of screws in the display area detracts from the image quality. The use of adhesive to affix the advertisements makes subsequent removal of the advertisement difficult.

U.S. Pat. No. 5,311,980, issued to Munkner et al., discloses printing advertisements on sheets of polyethylene, or similar material, and affixing them to the conveyor panels by way of a pressure sensitive adhesive. One of the main disadvantages of such sheets is their poor durability. Baggage carried on the conveyor tends to scratch and tear the sheet material. In addition, removal of sheet material from conveyor panels is time-consuming requiring either peeling off the sticker and removing the adhesive left behind or replacing the entire panel by a new panel with a new advertisement sheet.

U.S. Pat. No. 5,165,526, issued to Conklin Jr. discloses a conveyor system with conveyor panels that are constructed from transparent material. Each transparent conveyor panel has a viewable section and an overlapping section. An advertising sheet is affixed onto the underside of the viewable section of the transparent conveyor panel with an adhesive applied to the top surface of the advertising sheet. Conklin Jr. also discloses the use of ink that is hot stamped directly onto the transparent panels. As in the case of conveyor panels with decals for advertising material, advertising sheets glued to the transparent conveyor panels are difficult to remove limiting the reuse of these panels. Consequently, the entire panel must be removed from the conveyor belt and replaced with a new panel containing a new advertising sheet. Such a system is expensive and time-consuming. Obviously, when the advertising message is hot stamped directly onto the transparent panels, the transparent panel cannot be reused and must be replaced with a new panel having a new hot stamped message.

U.S. Pat. No. 5,280,831 issued to Conklin Jr. discloses a panel for use with conveyors having a belt plate instead of a conventional conveyor panel, a recess defined by spacers extending from at least two edges of the belt plate, and a transparent cover plate fastened to a top surface of the recess. An advertising sheet is affixed to the underside of a transparent cover plate with an adhesive. The transparent cover plate is then affixed by way of screws to the surface of the belt plate. This method of changing advertising sheets is labor intensive and the presence of screws through the advertisements may detract from the visual message on the sheet.

U.S. Pat. No. 5,427,227, issued to Crandall et al, discloses a conveyor system with porcelain enamel on steel pallets which are coupled to supporting members with wheels that roll along wheel tracks when a motive force is provided. Airport luggage carousels can be converted to this system by replacing the existing panels with porcelain enamel steel pallets. The porcelain enamel may have indicia or decorative designs. The main disadvantage of this conveyor system is the expense since changing an advertisement would require replacing the old porcelain enamel on the steel pallets with porcelain enamel having new indicia.

Conveyor belt apparatus for airports are disclosed by U.S. Pat. No. 3,410,390, issued to Petersen and U.S. Pat. No. 3,881,592, issued to Stimpson. There is no disclosure of displaying advertisements on conveyor panels in either of these patents.

Other types of display belts for advertisements are disclosed in the following patents: U.S. Pat. No. 5,596,828, issued to Smallwood, U.S. Pat. No. 4,979,591, issued to Habegger et al, U.S. Pat. No. 5,358,094, issued to Molinaro et al, U.S. Pat. No. 3,395,472, issued to Look, U.S. Pat. No. 3,849,918, issued to Mazzocco, Sr., and U.S. Pat. No. 5,244,080, issued to Bierbaum. None of the above patents disclose applications for airport conveyors or conveyor panels. In any event, none of the devices disclosed in the above patents would be able to withstand the abuse caused by heavy luggage on a normal airport conveyor.

U.S. Pat. No. 5,596,828, issued to Smallwood, discloses an endless belt display device for moving conveyor belt systems at checkout stands. The endless belt display has a top surface and a transparent panel having all but one edge bonded to the top surface of the belt. The panel forms a pocket with the belt that is adapted for receiving advertisements through the unbonded edge.

U.S. Pat. No. 3,849,918, issued to Mazzocco, Sr. discloses a continuous display device with display panels having a permanent portion and a removable portion. The permanent portion consists of an inner sheet of translucent or transparent plastic material. The removable portion consists of a pair of outer sheets of transparent material that form a pocket into which is inserted an advertising display sheet.

U.S. Pat. No. 4,979,591, issued to Habegger et al, discloses a conveyor belt with advertising indicia on a visible surface. A film of transparent plastic covers the visible surface to protect the advertising indicia. U.S. Pat. No. 5,358,094, issued to Molinaro et al, discloses a conveyor belt of the type to be used at checkout counters with advertisements that adhere to the conveyor belt through electrostatic attraction. U.S. Pat. No. 3,395,472, issued to Look, discloses a traveling tape display to be mounted on a store window where the advertising indicia is printed on the tape. U.S. Pat. No. 5,244,080, issued to Bierbaum discloses an information bearing belt conveyor with two layers. The top viewable layer has windows for receiving inserts with outlines of letters or figures. The shape of the windows are complementary to the inserts.

The present invention is designed to overcome many of the disadvantages and shortcomings of methods and apparatus for displaying advertising information on conveyor panels. Accordingly, it is the object of this invention to provide a device and a method of affixing advertisements to conveyor panels in such a way as to facilitate their installation and removal.

SUMMARY OF THE INVENTION

According to the invention, there is provided a conveyor panel for a conveyor which has a series of such conveyor panels that move in a closed path having linear sections and curved sections. The conveyor panel consists of a belt plate, a transparent plate, and a graphic display panel. The belt plate has a display region that is exposed to view when the belt plate is affixed to the conveyor. The display region consists of a recess bounded by two thickened regions along opposite sides of the belt plate and has slots that extend from the recess into the thickened regions. The transparent plate has protruding edges that fit snugly into the slots when the transparent plate is inserted into the recess and securely hold the transparent plate to the belt plate. The graphic display panel is positioned adjacent an underside of the transparent plate within the recess.

Preferably, the graphic display panel is an electronic display panel.

The graphic display panel maybe a poster having a printed surface. The poster may have an adhesive on its printed for affixing to the underside of the transparent plate. The poster may have an adhesive on an opposite surface to the printed surface for affixing the opposite surface to a support plate. The poster may have be formed into segments with each segment having substantially the same dimensions as the transparent plate.

The display region may include an elongated thickened region extending along a length perpendicular to the two thickened regions and over which a portion of another overlying belt plate is superimposed when the conveyor panel is installed on a conveyor.

According to the invention, there is provided another conveyor panel having a belt plate with a display region that is exposed to view when the belt plate is affixed to the conveyor. The display region consists of a recess bounded by two thickened regions along opposite sides of the belt plate. The conveyor panel further has a transparent plate dimensioned to fit into the recess and a poster. The printed surface of the poster is affixed to the underside of the transparent plate with an adhesive. The opposite surface to the printed surface of the poster is affixed to one of a ferromagnetic layer and a magnetic layer with an adhesive. Another one of the ferromagnetic layer and the magnetic layer is affixed to the recess of the belt plate. The magnetic force between the ferromagnetic layer and the magnetic layer securely holds the transparent plate and the poster to the belt plate.

BRIEF DESCRIPTION OF THE DRAWINGS

The novel features believed to characterize the invention are set forth in the appended claims. The invention, itself, however, as well as other features and advantages thereof, will be best understood by reference to the detailed description which follows, read in conjunction with the accompanying drawings, wherein:

DETAILED DESCRIPTION WITH REFERENCE TO DRAWINGS

Figure 1:
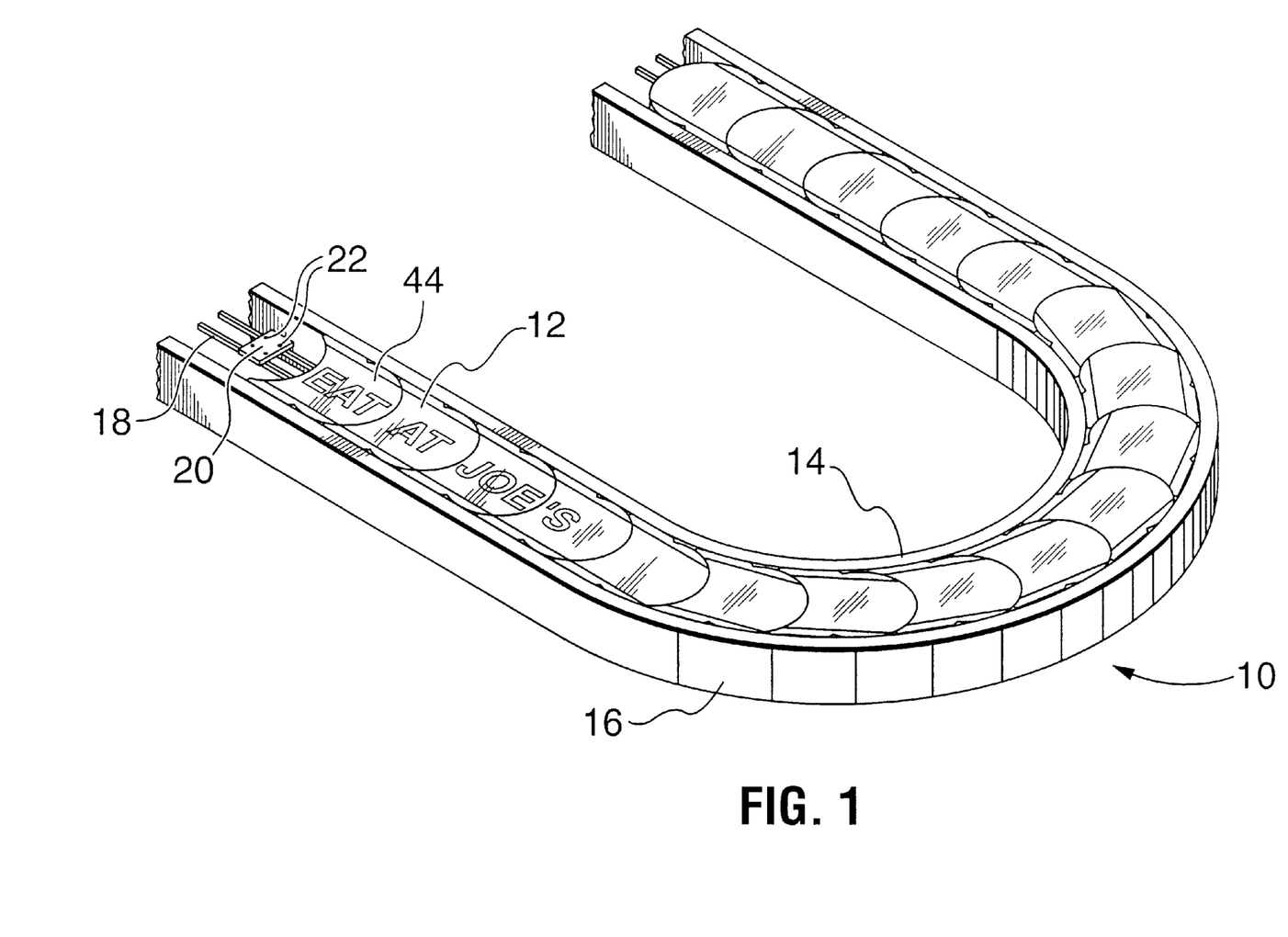
FIG. 1 is a perspective view of a load bearing conveyor with non-overlapping conveyor panels.

Referring to FIG. 1, a load bearing conveyor 10 with non-overlapping conveyor panels 12 consists of a belt (not shown) supporting a track 18 with rollers (not shown). Drive means (not shown) with attachment members 20 circulate on track 18 which extends in a continuous circuit around the path of load bearing conveyor 10. Attachment members 20 have screw holes 22 for affixing non-overlapping conveyor panels 12. Overlying structures 14, 16 cover side portions of non-overlapping conveyor panels 12. The attached conveyor panels 12 form a platform for carrying baggage and for displaying advertising information.

Figure 2:
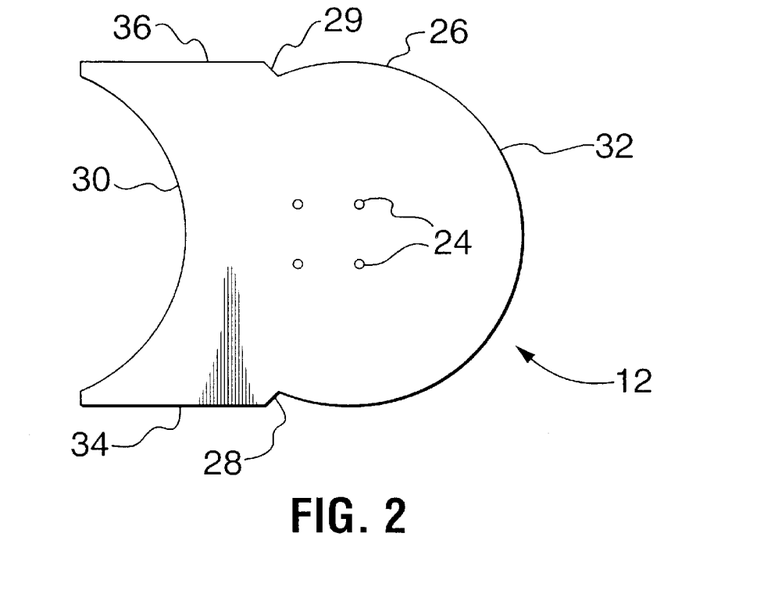
FIG. 2 is a bottom view of a non-overlapping conveyor panel.

Referring to FIG. 2, there is shown a bottom view of a non-overlapping conveyor panel 12 having a belt plate 26 with screw holes 24 that correspond to screw holes 22 in attachment member 20 so that non-overlapping conveyor panel 12 can be fastened to attachment member 20 on load bearing conveyor 10. Non-overlapping conveyor panel 12 has a convex side edge 30, an opposing concave side edge 32 of substantially the same radius of curvature as side edge 30. Side edges 34, 36 extend between convex side edge 30 to concave side edge 32. Indents 28, 29 are formed where side edges 34, 36 connect to concave side edge 32.

Figure 3:
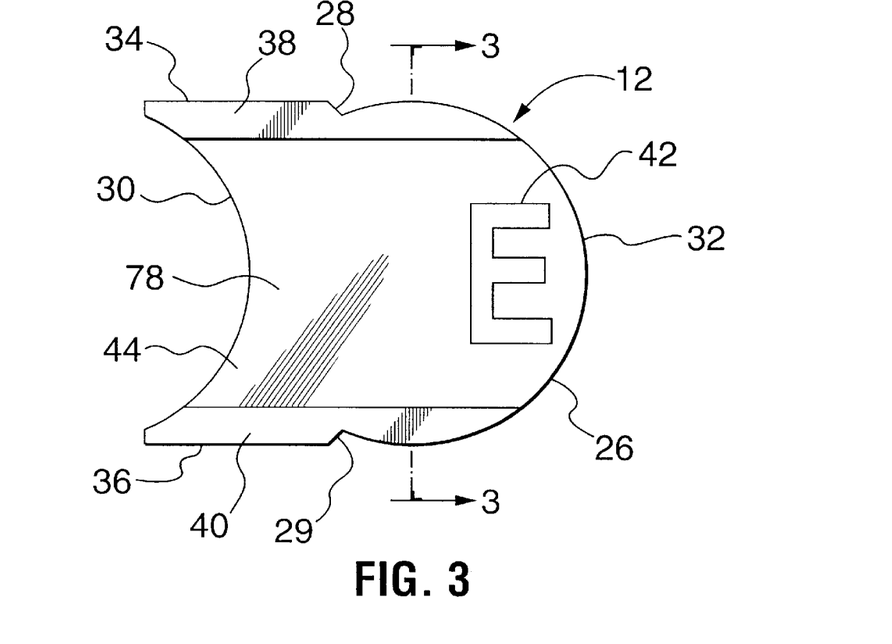
FIG. 3 is a top view of a non-overlapping conveyor panel.

Referring to FIG. 3, there is shown a top view of non-overlapping conveyor panel 12 having thickened portions 38, 40 along side edges 34, 36, respectively. When non-overlapping conveyor panel 12 is affixed to attachment member 20 on load bearing conveyor 10, thickened portions 38, 40 are hidden by overlying structures 14, 16. Thickened portions 38, 40 border a recess 42 for receiving a graphic display panel 44 and a clear, protective, transparent plate 78.

Figure 4:
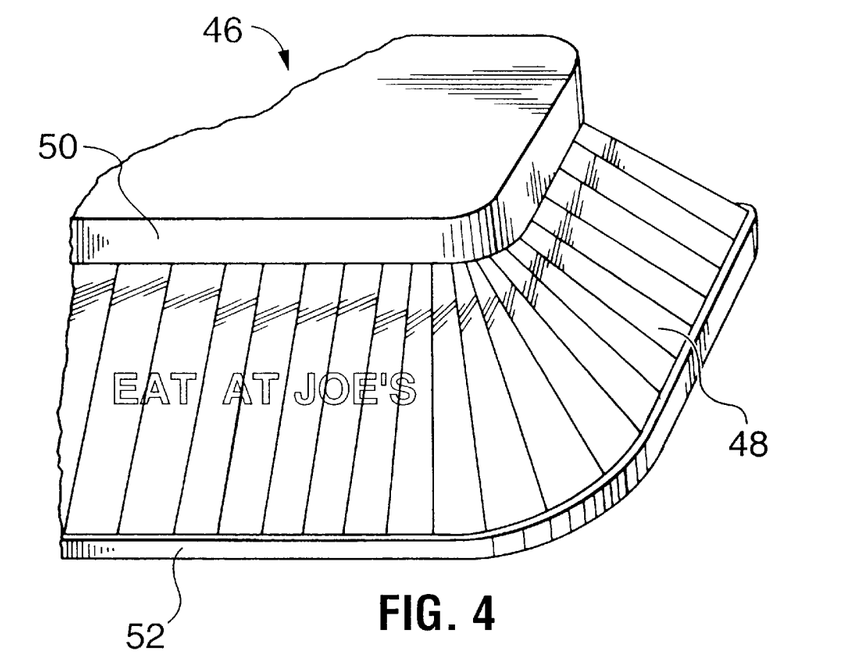
FIG. 4 is perspective view of a load bearing conveyor with overlapping conveyor panels displaying advertising information over several conveyor panels.

Referring to FIG. 4, a load bearing conveyor 46 consists of a plurality of conveyor panels 48 supported by an upper rail 50 and lower rail 52. Overlapping conveyor panels 48 are fastened by screws to a plurality of underlying attachment members 54 with screw holes 56. Attachment members 54 are coupled to drive means (not shown) that moves members 54 along a continuous circuit.

Figure 5:
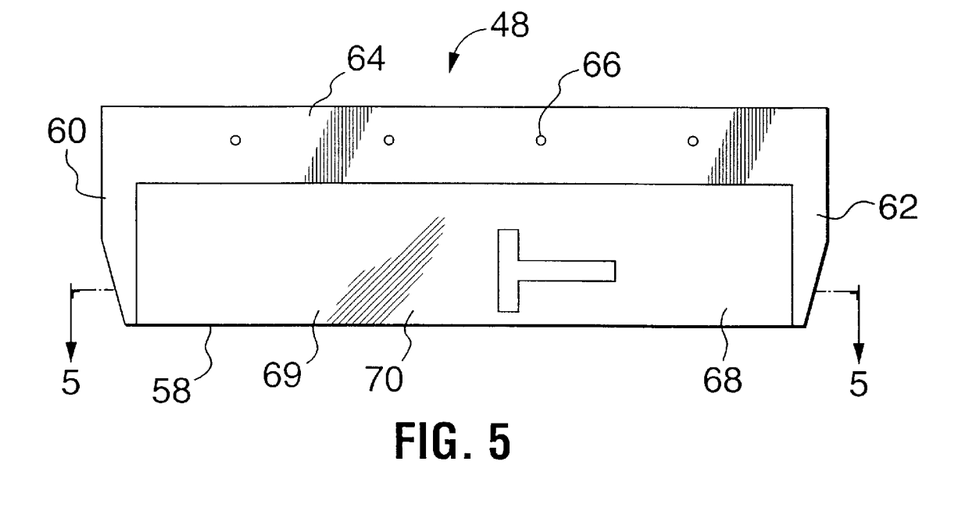
FIG. 5 is a top view of an overlapping conveyor panel.

Referring to FIG. 5, there is shown a top view of overlapping conveyor panel 48. Overlapping conveyor panel 48 has a belt plate 58 with thickened portions 60, 62 along the widths and 64 along the length of panel 48, respectively. Thickened portion 64 has screw holes 66 that correspond to screw holes 56 on attachment member 54 so that overlapping conveyor panel 48 can be fastened to attachment member 54 on load bearing conveyor 46. When overlapping conveyor panel 48 is installed on load bearing conveyor 46, a portion of another overlapping conveyor panel is superimposed over thickened portion 64. Thickened portions 60, 62, 64 border a recess 68 for receiving a graphic display panel 69 and a clear, protective, transparent plate 70.

Figure 6:
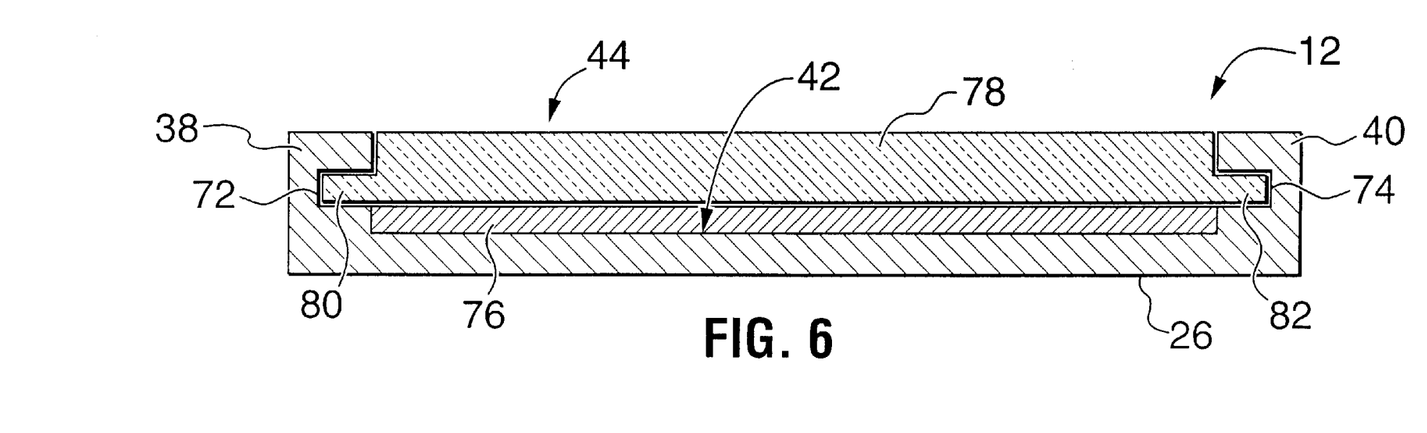
FIG. 6 is a cross-sectional view of a non-overlapping conveyor panel with an electronic display panel along line 4-4' of FIG. 3.

Referring to FIG. 6, a cross-section of non-overlapping conveyor panel 12 taken along line 3-3' of FIG. 3 shows thickened regions 38, 40 with slots 72, 74, respectively. Graphic display panel 44 consists of a thin television screen 76 which is affixed to a top surface of recess 42 on belt plate 26. Transparent plate 78 with protruded edges 80, 82 is positioned on top of television screen 76 to protect television screen 76 from any forces exerted by the baggage on conveyor panel 12. The top surface of transparent plate 78 is at or near the same level as the top surface of thickened portions 38, 40. When transparent plate 78 is inserted into recess 42, protruded edges 80, 82 slide into slots 72, 74, respectively. The frictional force between protruded edges 80, 82 and slots 72, 74 securely holds transparent plate 78 to belt plate 26.

Figure 7:
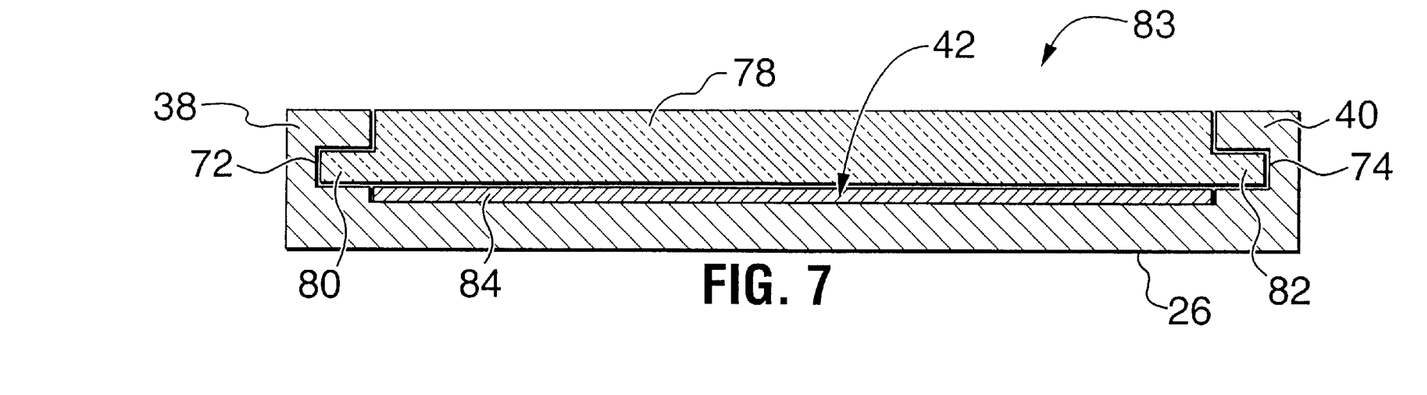
FIG. 7 is a cross-sectional view of a non-overlapping conveyor panel with a poster along line 4-4' in FIG. 3.

Referring to FIG. 7, a cross-section of non-overlapping conveyor panel 83 which has a top view the same as that of FIG. 3 shows an alternate embodiment having a graphic display panel 44 consisting of an advertising poster 84 positioned adjacent to a top surface of recess 42 and a transparent plate 78 positioned on top of poster 84.

Figures 8, 9:
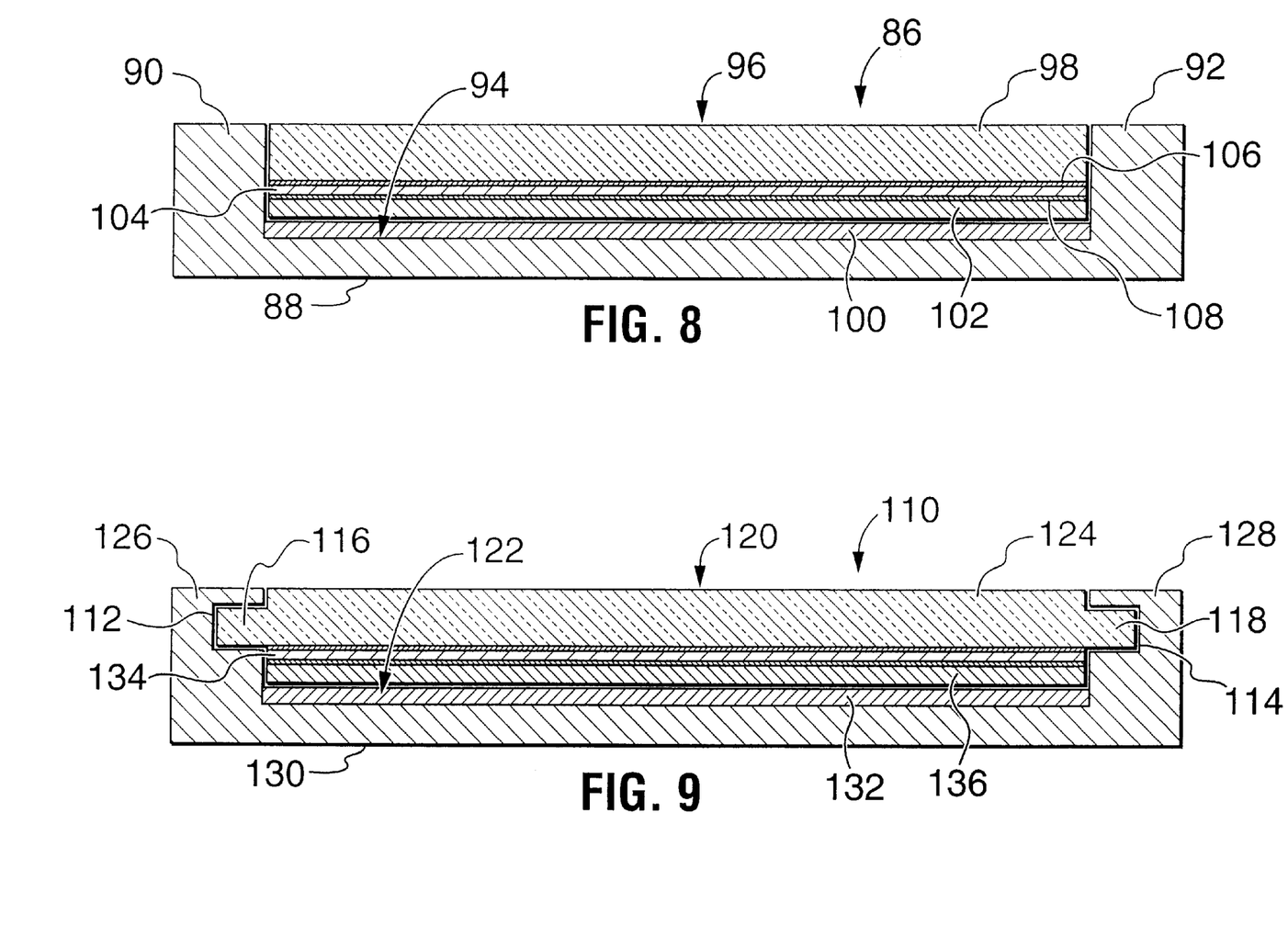
FIG. 8 is a cross-sectional view of an alternate embodiment of a non-overlapping conveyor panel having a magnetic sheet and a ferromagnetic sheet.
FIG. 9 is a cross-sectional view of an alternative embodiment of a non-overlapping conveyor panel having a magnetic sheet, a ferromagnetic sheet and slots.

Referring to FIG. 8, a cross-section of non-overlapping conveyor panel 86 which has a top view the same as that of FIG. 3 shows an alternate embodiment having an advertising display assembly 96 secured to a belt plate 88 through magnetic forces. A magnetic plate 100 is affixed to a top surface of a recess 94 bounded by thickened portions 90, 92 of belt plate 88. Advertising display assembly 96 is dimensioned to fit into recess 94 so that the top surface of advertising display assembly 96 is at or near the same level as the top surface of thickened portions 90, 92.

Advertising display assembly 96 consists of a clear, plastic transparent plate 98, an advertising poster 104 with a top, viewable surface and a bottom, non-viewable surface, and a ferromagnetic plate 102. The top surface of advertising poster 104 is affixed to transparent plate 98 with an adhesive layer 106. The bottom surface of advertising poster 104 is affixed to ferromagnetic plate 102 with an adhesive layer 108. Ferromagnetic plate 102 and magnetic plate 100 attract each other with sufficient magnetic force to secure advertising display assembly 96 to recess 94 of non-overlapping conveyor panel 86.

Referring to FIG. 9, a cross-section of non-overlapping conveyor panel 110 which has a top view the same as that of FIG. 3 shows an alternate embodiment having an advertising display assembly 120 secured to a belt plate 130 through magnetic forces and frictional forces. A magnetic plate 132 is affixed to a top surface of a recess 122 bounded by thickened portions 126, 128 of belt plate 130. Thickened portions 126, 128 have slots 112, 114 formed therein respectively. Advertising display assembly 120 consisting of a transparent plate 124 having protruded edges 116, 118, a poster 134, and a ferromagnetic plate 136. When advertising display assembly 120 is inserted into recess 122, protruded edges 116, 118 of transparent plate 124 slide into slots 112, 114 of belt plate 130, respectively, and magnetic plate 132 on belt plate 130 attracts ferromagnetic plate 136 of advertising display assembly 120.

It is to be understood that all embodiments described above can be applied to either overlapping panels (FIG. 5) or non-overlapping panels. A section of overlapping panel taken along line 5–5' as shown in FIG. 5 would have features identical to the features shown in cross-sections of non-overlapped panels described in FIGS. 6–9. Furthermore, elongated thickened region 64 along the length of the overlapping panel 48 and over which a portion of another belt plate is superimposed may also have a slot in addition to the slots in the thickened regions along the width of the overlapping conveyor panel. In that case, clear, protective, plastic transparent plate would have a third protruding edge to fit into the slot of elongated thickened region 64.

It will be obvious to one skilled in the art that the conveyor panels envisioned within the scope of this invention may be implemented to achieve the functionality envisioned herein in various ways. For instance, instead of a television screen 76, other electronic displays such as a LCD panel may be affixed to the top surface of recess 42.

In non-overlapping conveyor panel 83, poster 84 may have an adhesive layer on its top, viewable surface for securing poster 84 to transparent plate 78. Poster 84 may also have adhesive layer on its bottom, non-viewable surface for securing poster 84 to a support plate.

A commercially available magnetic tape 144 or ferromagnetic tape 146 could be used instead of magnetic plate 100 and ferromagnetic plate 102. Magnetic paint 140 and ferromagnetic paint 142 could also be applied to the top surface of recess 94 and bottom, non-viewable surface of poster 104. The only requirement is that the magnetic force between the magnetic layer and ferromagnetic layer must be of sufficient strength to attract and securely hold advertising display assembly 96 to recess 94.

Figure 10:
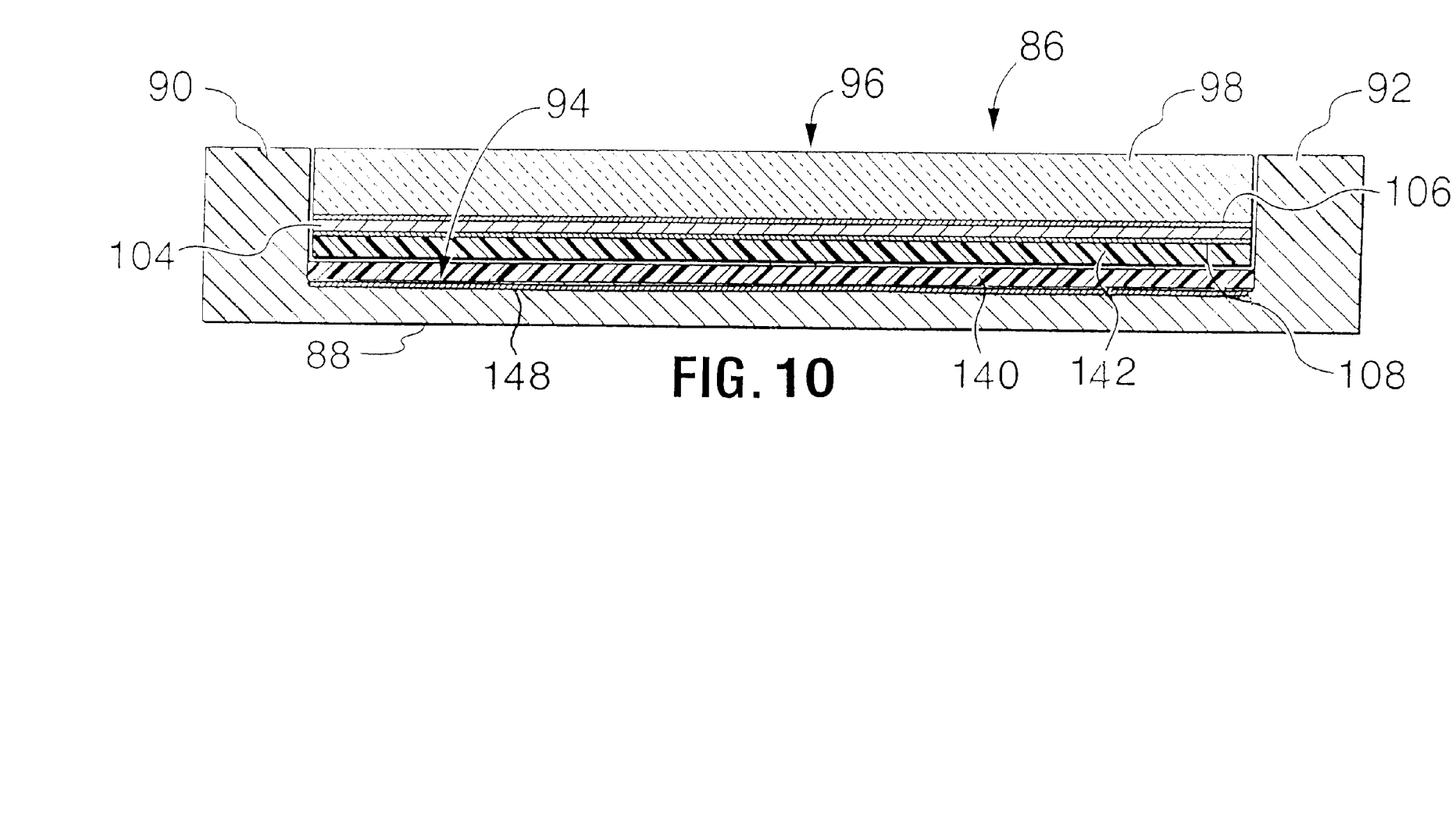
FIG. 10 is a cross-sectional view of an alternative embodiment of a non-overlapping conveyor panel having a magnetic paint and a ferromagnetic paint.

Referring to FIG. 10, the magnetic plate 100 of FIG. 8 has been replaced by magnetic paint 140 and adhesive layer 148 and the ferromagnetic plate 102 of FIG. 8 has been replaced by ferromagnetic paint 142.

Figure 11:
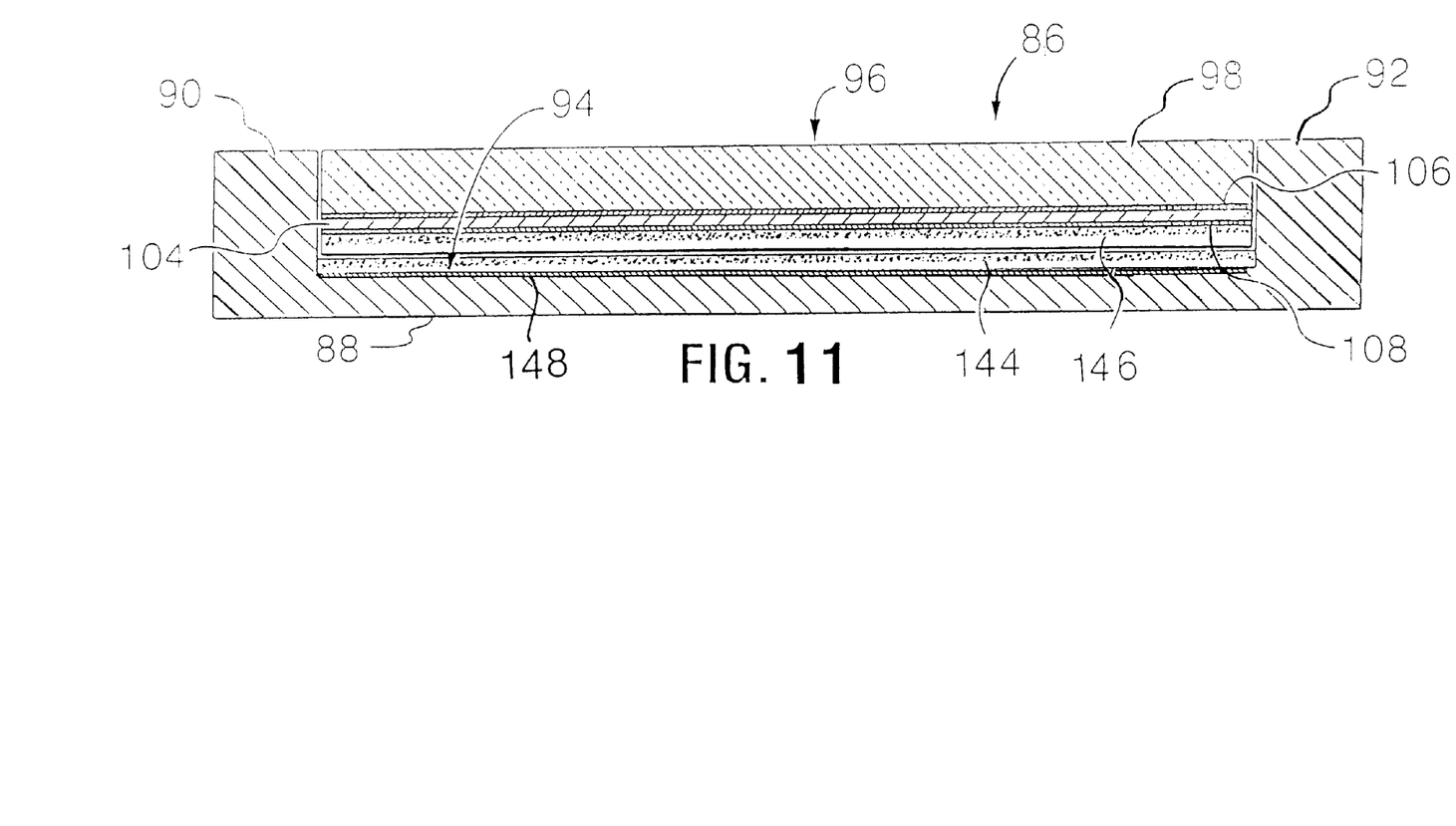
FIG. 11 is a cross-sectional view of an alternative embodiment of a non-overlapping conveyor panel having a magnetic tape and a ferromagnetic tape.

Referring to FIG. 11, the magnetic plate 100 of FIG. 8 has been replaced by magnetic tape 144 and adhesive layer 148 and the ferromagnetic plate 102 of FIG. 8 has been replaced by ferromagnetic tape 146.

Other means of affixation besides adhesive layers may be used to affix advertising posters to transparent plastic sheets, magnetic plates, and support plates.

Installation of a non-overlapping conveyor panel 12 on a load bearing conveyor 10 involves first affixing conveyor panel 12 to attachment member 20 by inserting screws in screw holes 28 in panel 12 and corresponding screw holes 22 in attachment member 20. Since an electronic display such as a television screen 76 would be already affixed to the top surface of recess 42 of conveyor panel 12, completing the installation would simply require aligning the protruding edges 80, 82 of transparent panel 78 with the slots 72, 74, respectively, and then sliding transparent panel 78 into recess 42. In the case where the graphic display is an advertising poster 84, after affixation of conveyor panel 12 on a load bearing conveyor 10, poster 84 is positioned in the recess, followed by the alignment of the protruding edges 80, 82 of transparent panel 78 with slots 72, 74, respectively. Then, transparent panel 78 is slid into recess 42.

Installing non-overlapping conveyor panels 86 having a magnetic plate 100 affixed to the top surface of recess 94 on a load bearing conveyor 10 also involves first affixing conveyor panel 86 to attachment member 20 by inserting screws in screw holes in panel 86 and corresponding screw holes 22 in attachment member 20. Advertising display assembly 96 may then be assembled at the job site. Obviously, advertising display assembly 96 may be assembled at the workshop prior to the installation of non-overlapping conveyor panels 86. Referring to FIG. 8, assembly of each advertising display assembly 96 involves affixing transparent plastic sheet 98 to the top surface of advertising poster 104 with an adhesive layer 106 and affixing ferromagnetic support plate 102 to the bottom surface of advertising poster 104 with adhesive layer 108. Advertising display assembly 96 is then inserted into recess 94, with the attractive magnetic force between the ferromagnetic support plate 102 and magnetic plate 100 securing the advertising display assembly 96 to belt plate 88.

Installing non-overlapping conveyor panels 110 having a magnetic plate 132 affixed to the top surface of recess 122 on a load bearing conveyor 10 and slots 112, 114 also involves first affixing conveyor panel 110 to attachment member 20 by inserting screws in screw holes in panel 110 and corresponding screw holes 22 in attachment member 20. Advertising display assembly 120 is assembled as described above. Then, protruding edges 116, 118 of transparent panel 124 are aligned with slots 112, 114, respectively, and advertising display assembly 120 is slid into recess 122.

It is to be understood that the methods of installing non-overlapping conveyor panels described above can be applied to overlapping panels.

Accordingly, while this invention has been described with reference to illustrative embodiments, this description is not intended to be construed in a limited sense. While the present invention has been described with particularity, it should be understood that various modifications and alterations may be made therein without departing from the spirit and scope of the invention set forth in the appended claims.

I claim:

1. A conveyor panel for a conveyor which has a series of such panels which move in a closed path having linear sections and curved sections, comprising:
   (a) a belt plate affixable to said conveyor and having a display region exposed to view when in place on said conveyor, the display region being a recess bounded by two thickened regions along opposite sides of said belt plate and having slots extending from the recess into the thickened regions;
   (b) a transparent plate having protruding edges snugly slidably insertable into the slots such that when said transparent plate is inserted into the recess, the protruding edges slide into the slots securely holding said transparent plate to said belt plate, and;
   (c) a graphic display panel positioned adjacent an underside of said transparent plate within said recess.

2. A conveyor panel according to claim 1, wherein said graphic display panel is a poster having a printed surface.

3. A conveyor panel according to claim 2, wherein said poster has an adhesive on the printed surface for affixing to the underside of said transparent plate.

4. A conveyor panel according to claim 3, including a support plate, wherein said poster has an adhesive on an opposite surface to the printed surface for affixing said poster to said support plate.

5. A conveyor panel according to claim 2, wherein said poster is formed into segments with each segment having substantially the same dimensions as said transparent plate.

6. A conveyor panel for a conveyor which has a series of such panels which move in a closed path having linear sections and curved sections, comprising:
   (a) a belt plate affixable to said conveyor and having a display region exposed to view when in place on said conveyor, the display region being a recess bounded by two thickened regions extending along opposite sides of said belt plate;
   (b) a transparent plate dimensioned to fit into the recess of said belt plate;
   (c) a poster having a printed surface and an opposite surface to the printed surface, with an adhesive on the printed surface, the printed surface affixed to an underside of said transparent plate;
   (d) one of a ferromagnetic layer and a magnetic layer on the opposite surface of said poster;
   (e) another one of the ferromagnetic layer and the magnetic layer on a top surface of the recess of said belt plate; and,
wherein said ferromagnetic layer and said magnetic layer securely hold said transparent plate and said display poster to said belt plate.

7. A conveyor panel according to claim 6, wherein said ferromagnetic layer is ferromagnetic paint.

8. A conveyor panel according to claim 6, wherein said magnetic layer is magnetic paint.

9. A conveyor panel according to claim 6, wherein said ferromagnetic layer is a ferromagnetic tape.

10. A conveyor panel according to claim 6, wherein said magnetic layer is a magnetic tape.

11. A conveyor panel according to claim 6, wherein said poster is formed into segments with each segment having substantially the same dimensions as said transparent plate.

12. A conveyor panel according to claim 6, wherein said magnetic layer is affixed to an opposite surface of said poster and said ferromagnetic layer is affixed to the top surface of the recess of said belt plate.

13. A conveyor panel according to claim 6, wherein said magnetic layer is on the top surface of the recess of said belt plate and said ferromagnetic layer is on the opposite surface of said poster.

14. A conveyor panel according to claim 6, wherein the opposed thickened regions extending along opposite sides of said belt plate have slots extending from the recess into at least two opposed thickened regions and said transparent plate has protruding edges snugly slidably insertable into the slots such that when said transparent plate is inserted into the recess, the protruding edges slide into the slots further securing said transparent plate to said belt plate.

* * * * *